Fig. 1.

April 21, 1959 — R. C. OLIVER — 2,883,333
HYDROCARBON CONVERSION PROCESS AND APPARATUS
Filed May 12, 1955 — 2 Sheets-Sheet 2

INVENTOR.
ROBERT C. OLIVER,
BY
AGENT.

United States Patent Office 2,883,333
Patented Apr. 21, 1959

2,883,333

HYDROCARBON CONVERSION PROCESS AND APPARATUS

Robert C. Oliver, Long Beach, Calif., assignor to Union Oil Company of California, Los Angeles, Calif., a corporation of California Application May 12, 1955, Serial No. 507,892

13 Claims. (Cl. 208—136)

This invention relates to a continuous process and apparatus for the contacting of a fluid with a granular solid contact material and in particular relates to an improved process and apparatus for hydrocarbon conversions wherein a hydrocarbon stream is contacted with a stream of granular solid hydrocarbon conversion catalyst, and which material is recirculated successively through a contacting or reaction zone and through a solids regeneration or reheating zone. One specific feature of the present invention is an improved method and apparatus for regenerating and reheating solid catalyst or other solid contact material employed in such processes.

Hydrocarbon fractions in particular and many other fluid reactant streams in general are advantageously treated under reaction conditions of temperature and pressure in the presence of a solid granular contact material, which may or may not have a catalytic activity, to produce fluid products having improved properties. In the field of petroleum refining, hydrocarbon fractions boiling between the limits of about 75° F. and 1000° F., and including the light and heavy naphthas or gasolines and the light and heavy gas-oil fractions, are treated at relatively high pressures and temperatures in the presence of solid contact materials to coke, crack, desulfurize, denitrogenate, hydrogenate, dehydrogenate, reform, aromatize, isomerize, or polymerize such hydrocarbon fractions to produce products having desirable properties which particularly well suit them for hydrocarbon cracking feed, gasoline blending stock, solvents, or diesel or jet engine fuels, and the like.

In all of the foregoing processes which utilize a recirculating stream of solid contact material, the usual problems of transporting the solids with minimum energy requirement and without substantial attrition loss in a superatmospheric temperature and pressure system are involved. In some cases separate contacting and regeneration vessels are employed which require separate conveyance steps to transport the solids from the bottom of each vessel to the top of the other. Sometimes these processes are effected in a single column so that only a single solids transport step is required, the regenerator and reactor being located one above the other in the column. The disadvantage of the former modification is the necessity for two columns and the requirement for two separate solids handling steps. The principal disadvantage of the second modification is primarily structural in that with superimposed reaction and regeneration zones an excessively high mechanical structure is required, sometimes exceeding 200 feet in elevation. A further disadvantage of the single column operation lies in the fact that the conveyance distance is not materially different from the total conveyance distance in the two-column modification.

Conventionally, the granular solids have been conveyed for recirculation by mechanical elevators, by suspension in a conveyance fluid in the well known gas lift or pneumatic conveyance systems, and the like. Although the mechanical elevators operate with quite low energy requirements, they are practically impossible to maintain at operating temperatures of around 1000° F. and at superatmospheric pressure conditions. Although the so-called gas lift type of conveyer readily operates at superatmospheric pressures, tremendous quantities of gas are required in contacting systems recirculating contact material at high solids to fluid ratios. In addition, the fact that the solid particles move at relatively high velocities of the order of 50 to 100 feet per second and are free to impact the inner conveyer walls and each other, results in excessively high solids or catalyst attrition rate.

A recent improvement in solids-fluid contacting processes, as particularly applied to hydrocarbon conversion operations employing granular solids material such as catalyst, includes a solid regeneration step which has successfully eliminated all solids conveyance steps as such. The improved process has reduced the principal operations to the maintenance of a generally downward movement of granular solid material through one contacting zone, such as a downwardly moving bed or body of fluidized solids in contact with a fluid to be converted, and the maintenance of a dense compact upwardly moving bed of solids through a regeneration zone in contact with a regeneration fluid which simultaneously conveys and regenerates the solids and delivers them to the top of the first contacting zone. The specific procedures by which this unusual upward catalyst movement is effected are more fully described below.

A regeneration fluid, which comprises flue gas from the regeneration of spent hydrocarbon conversion contact solids, is recirculated upwardly through the dense compact mass of catalyst in the regeneration zone and is discharged at an elevated temperature containing the liberated heat of regeneration as sensible heat. This heated gas is cooled to recover the heat of regeneration, additional oxygen is added to the cooled gas to provide the regeneration fluid, and the mixture is pressured into the regeneration zone for passage therethrough. Suitable steps are taken to maintain the inlet temperature of the regeneration fluid at a value sufficient to initiate combustion of the hydrocarbonaceous deposit, referred to generally as coke, which is deposited on the contact solids. In this improved process the granular solids are transported through an absolute minimal distance and it has been found that substantially no granular solids attrition and equipment erosion are caused. Further advantages include the minimizing of catalyst or granular solids inventory in the system, the simplification of process equipment required, and a corresponding reduction in capital investment required to construct the apparatus.

When this improved process, or any other hydrocarbon conversion process including a contact material regeneration step, is applied to the conversion of hydrocarbon stocks which are contaminated with hydrocarbon derivatives of sulfur, it has been found that a variable amount of sulfur in free or combined form or both is built up upon the solid catalysts along with the catalytic coke. Upon regeneration with an oxygen containing gas, the spent regeneration gases produced are heavily contaminated with sulfur dioxide and sulfur trioxide in various amounts. The presence of the sulfur trioxide is exceedingly disadvantageous in any of the processes for hydrocarbon conversion because of its corrosive character and because of atmospheric pollution problems. It is especially disadvantageous in the improved process discussed above because of the fact that a flue gas recycle stream is employed which is cooled in one part of the cycle. The sulfur trioxide readily forms sulfuric acid in the humid spent flue gas which has an exceedingly high dew point, sometimes as high as 500° F. or higher depending upon regeneration conditions, and the resulting corrosive condensate is difficult to handle. These problems can be overcome by the use of expensive alloys such as Hastelloy D, or ceramic or glass linings, etc. in the equipment, or by the attempted removal of all water vapor from the flue gas recycle, or by limiting the degree of outside cooling to minimum temperatures above the sulfuric acid dew point. These procedures are highly impractical and seriously limit the applicability of this process for catalyst regeneration for the conversion of sulfur contaminated hydrocarbons.

The present invention is therefore directed to a particular improvement in any sulfur containing catalyst regeneration process and to the improvement of the preferred hydrocarbon conversion process described above in which the sulfuric acid dew point, corrosion, and atmospheric pollution problems are either eliminated or substantially reduced. When the recycle regeneration fluid is treated as hereinafter described, the flue gas cooling step may be operated to reduce the flue gas recycle temperatures to nearly as low as the water vapor (actually sulfurous acid) dew point of the spent regeneration gas without sulfuric acid precipitation and its attendant problems or to even lower temperatures such as about 100° F. with provision for condensate removal. Under the conditions of the process of the present invention substantially no sulfuric acid is present.

It is accordingly a primary object of this invention to provide an improved process for solids-fluid contacting wherein the granular solids require oxidative regeneration.

It is a further object of this invention to provide an improved process for the conversion of hydrocarbons containing hydrocarbon derivatives of sulfur which in turn contaminate the solid contact material with sulfur and therefore cause the generation of corrosive sulfur oxides during regeneration.

A more particular object is to improve the regeneration of spent catalysts which have been employed in the conversion of hydrocarbons contaminated with hydrocarbon derivatives of sulfur and to provide for recycle flue gas cooling of the catalyst during regeneration so as to eliminate sulfuric acid therefrom, permit lower rates of recycle flue gas and/or increased rates of catalytic coke burn-off, and simultaneously eliminate the sulfuric acid corrosion problem.

It is also an object of this invention to provide an improved apparatus to carry out the aforementioned objects.

Other objects and advantages of the present invention will become apparent to those skilled in the art as the description thereof proceeds.

Briefly, the present invention comprises a solids-fluid contacting process and an improved regeneration system for the regeneration of spent solid catalysts or solid contact materials which are contaminated with sulfur and which also may or may not be contaminated with and deactivated by a hydrocarbonaceous deposit generally termed coke. The present invention is typically applied to the regeneration of spent catalytic solids produced during the conversion of hydrocarbons which are more or less heavily contaminated with hydrocarbon derivatives of sulfur. These processes include hydrocarbon cracking, hydrocracking, desulfurization, reforming, hydrogenation, dehydrogenation, aromatization and others. The spent granular solid material appears to contain sulfur or combined sulfur and is regenerated by high temperature contact with an oxygen containing regeneration gas. Preferably a flue gas regeneration fluid is recirculated successively through the regeneration zone and an external cooling zone in which heat of regeneration is recovered. The spent regeneration gas is hot and humid, and while substantially free of oxygen it is contaminated with sulfur oxides such as sulfur dioxide and sulfur trioxide.

In the preferred modification of this invention the spent regeneration gas is disengaged from the mass of regenerated catalyst emerging from the top of the regeneration zone and is removed therefrom at a temperature between about 900° F. and about 1200° F. This gas is then passed, with or without a small degree of initial cooling at a relatively high temperature, through direct contact with a mass of solid carbonaceous material such as coal, coked coal, petroleum coke, coal tar coke, activated charcoal of vegetable, animal or mineral origin whereby a substantially complete elimination of any residual oxygen, sulfur trioxide and sulfuric acid vapor from the flue gas is achieved. The contact is effected at temperatures above the sulfuric acid dew point, variable in the range of from 500° F. to 700° F. and the temperature at which the spent regeneration gas is produced, maximum about 1200° F. Very effective results have been obtained with temperatures of from 700° F. to 1000° F.

On cooling the thus treated flue gas, it is found that the dew point has been very substantially reduced by an amount often as great as 500° F. so that it can be cooled to the water dew point without the preliminary formation of a liquid sulfuric acid phase. The thus treated spent regeneration gas can therefore be cooled to temperatures between about atmospheric and about 250° F., depending upon the amount of water vapor and the pressure of the gas, without the precipitation of sulfuric acid. The gas may then be compressed, oxygen added, and the mixture recirculated as fresh regeneration gas. If desired, the spent flue gas may be compressed first, then treated with the carbonaceous material as above described, then cooled and recirculated.

Although the foregoing treatment of hot sulfur trioxide containing flue gas can be effected in a separate treating stage, such as by passing all or a part thereof through a separate vessel containing the carbonaceous contact material, one preferred form of the present invention utilizes the spent hydrocarbonaceous catalyst or coked contact material from the reactor. In typical hydrocarbon conversion processes the spent solids are hot (800° F. to 1100° F. for example) and contain a deposit of coke amounting to between about 1% and about 10% by weight of the total solids. In this modification, the hot spent regeneration gas is passed in contact with the spent coked solids adjacent the solids outlet to the hydrocarbon conversion zone and before entry of such solids into the regeneration zone. If desired the spent flue gas may be cooled preliminarily to a temperature approximating that of the spent solids. It has been found that the treatment of spent flue gas with the spent coked solids effects not only a substantial elimination of sulfur trioxide and sulfuric acid from the gas, but an appreciable reduction in the amount of catalytic coke which must be burned from the spent solids is achieved presumably through oxidation by the higher sulfur oxides and residual oxygen of a portion of this hydrocarbonaceous material. The sulfur trioxide and sulfuric acid free flue gas may then be cooled to temperatures as low as 100° F. without acid precipitation and then recirculated as above described.

For example, spent regeneration gas at 1100° F. could heretofore be cooled only to about 600° F. before sulfuric acid deposition began to occur. In the present invention spent flue gas at 1100° F. can now be cooled to as low as 100° F. without sulfuric acid precipitation. A 150% increase in the coke burn-off load in the regeneration zone is thereby permitted, or a 60% decrease in the required flue gas recirculation rate for a given coke burn-off load may be effected. In either case, the coke treated flue gas may be readily cooled to atmospheric temperatures without the problems referred to above.

The present invention is preferably applied to the improvement of hydrocarbon conversion processes in which spent granular solids removed from the bottom of the reaction zone are conveyed upwardly as a dense moving bed through the conveyance-regeneration zone or conduit. The upward movement of dense solids masses is obtained through a series of novel and critical steps. The spent granular solids are introduced into the conveyance-regeneration zone in such a manner that its inlet opening is submerged and surrounded by a dense bed of solids to be conveyed. This is conveniently done by providing an induction zone or chamber into which the solids may be introduced at its upper end and surrounding the inlet opening of the conveyance-regeneration zone at a low point therein, so that solids introduced form a dense mass to cover and submerge the inlet opening. Immediately adjacent the outlet opening of the conveyance-regeneration zone, a means is provided for applying a thrust, compacting, or solid flow restricting force against the moving bed of regenerated and conveyed granular material discharging therefrom. This may be done in several ways including the disposition of a mesh or plate or cap immediately adjacent the upper outlet opening against which the moving bed of solids flows and then reverses its direction, or by discharging the solids in any direction directly into a chamber against a wall or roof thereof, or against a bed of previously discharged solids so that the outlet opening is submerged by a bed of such solids, or by discharging the solids downwardly into such a chamber to form a conical pile whose apex intersects the outlet opening. The object of this step is to in some way restrict the discharge of solids at the outlet opening without effecting any substantial restriction on the discharge of conveyance-regeneration fluid at the same point. In this way the granular material in the conveyance-regeneration line is prevented from becoming fluidized or suspended in the conveyance fluid while it is moved even though the actual gas velocities through the upwardly moving bed may be well above that necessary to suspend or fluidize the solids were it not for the outlet restriction. The moving solids are thus maintained during regeneration and conveyance substantially at their static bulk density, that is, at the same bulk density as that of a downwardly moving gravity-packed bed, which in turn is substantially the same as the bulk density of the solids when at rest.

The granular solids in this dense-packed form are caused to move by passing a concurrent flow of conveyance-regeneration fluid upwardly through the conveyance-regeneration zone at a rate sufficient to overcome the opposing forces of gravity acting on the solids and also to overcome opposing forces of friction of conveyance zone walls and the like which act against the solids when they are conveyed. This fluid flows through the serially connected interstices of the dense-packed mass of granular solids which presents a high resistance, elongated path for the fluid flow. By maintaining a substantial pressure differential between the inlet and the outlet of the conveyance-regeneration zone, a sufficient quantity of fluid is forced to flow therethrough, generating a more or less constant pressure gradient at all points along the length of the conveyance-regeneration zone so as to apply a conveyance force uniformly to the solids bed throughout the zone. The ratio of the resulting pressure gradient tending to move the solids to the forces of gravity acting in the opposite direction has been termed the conveyance force ratio and is given by:

$$\frac{\frac{dp}{dl}}{\rho_s \cos \theta} \quad (1)$$

wherein $$\frac{dp}{dl}$$

is the pressure gradient in pounds per square foot per foot, $\rho_s$ is the static bulk density of the granular solids being conveyed in pounds per cubic foot, and $\theta$ is the angular deviation of the direction of conveyance from an upward vertical reference axis. When the conveyance fluid flows at a rate sufficient to generate a pressure gradient $$\frac{dp}{dl}$$

which equals the forces of gravity expressed by the term ($\rho_s \cos \theta$) in Equation 1, a slight additional flow of fluid is sufficient to overcome opposing forces of friction and permit the solids to move continuously in dense or compact form as an upwardly moving bed. The dense phase conveyance can then be maintained if a bed of solids is continuously supplied at the inlet and dense granular solids are continuously withdrawn at a controlled rate from the discharged mass of solids at the outlet of the conveyance-regeneration zone.

Because of the substantial pressure gradient characteristic of this form of conveyance and because of the fact that there is only a relatively minor pressure differential existing between the inlet and outlet of a solids-fluid contacting vessel, it is apparent that the present conveyance-regeneration system cannot be directly connected at both its outlet and inlet respectively to the solids inlet and outlet of the contacting zone. In the present invention only one of the aforementioned connections is made and the other connection is made indirectly through a granular solids pressuring vessel into which granular solids are charged at a relatively low pressure, the vessel is sealed, high pressure fluid is injected to increase the pressure by an amount approximating the characteristic pressure differential of the conveyance-regeneration zone, and then the solids are discharged at the higher pressure. If the inlet to the conveyance-regeneration zone communicates directly with the outlet of the reaction zone, this pressuring step is employed to receive solids from the outlet of the conveyance-regeneration zone and to pressure them into the top of the reaction zone. When the outlet of the conveyance zone communicates directly with and at substantially the same pressure as the reaction zone, the pressuring zone receives solids at that pressure from the bottom of the reaction zone and pressures them into the inlet of the conveyance-regeneration zone as is illustrated in the accompanying drawing. So far as the present invention is concerned, the pressuring step can be in any part of the cycle, that is, either before or after conveyance-regeneration.

The present invention is particularly well adapted to the handling of granular solid materials in the well known hydrocarbon conversion processes mentioned above and in which a liquid or vaporized hydrocarbon is contacted directly with a moving mass of contact material, usually having catalytic activity. During such process, the catalyst ordinarily becomes deactivated after a variable period of contact and is contaminated and deactivated with coke. During the regeneration, the coked catalyst is treated with an oxygen-containing regeneration gas whereby the hydrocarbonaceous material is burned from the catalyst and the activity is restored. With most spent hydrocarbon conversion catalysts, the oxygen-containing regeneration gas will not initiate and sustain combustion until the spent catalyst is raised in temperature to about 300° F. to 500° F. Most hydrocarbon conversion catalysts cannot be heated during regeneration to temperatures much above about 1200° F. and the spent conveyance-regeneration gas is disengaged from the regenerated catalyst at temperatures controlled to stay below this value. These then are the temperature limits within which the conveyance-regeneration zone must operate when handling spent hydrocarbon conversion catalysts.

The exothermic heat of regeneration liberated in the regeneration zone is contained as sensible heat in the spent flue gas or regeneration gas which is produced at the top of the regeneration zone at a temperature of about 1000° F. to 1200° F. The maximum temperature value here is limited by the temperature which the catalyst or solid contact material can withstand without suffering thermal damage. This sensible heat is dissipated or at least partly recovered in heating process streams in the cooling zone previously referred to, and which is disposed at a point external to the regeneration zone. This hot flue gas may be precooled somewhat to a temperature above the sulfuric acid dew point prior to treatment wtih the carbonaceous material, or it may be passed directly from the regeneration zone outlet into contact therewith. The flue gas is then cooled to a low temperature approaching atmospheric temperature to recover the heat of regeneration.

Several modifications of handling the thus treated flue gas in the process of this invention may be utilized, the particular procedure being selected after consideration of the operating conditions in the particular process, the ignition temperature of the spent solids, the physical and chemical properties of the conversion catalyst, etc.

The first modification consists in cooling the treated spent regeneration gas to below the sulfuric acid dew point of the untreated gas, that is below about 800° F. to 900° F., but above the 300° F. to 500° F. ignition point of the spent coked solids. Oxygen is then added to the thus cooled gas and the fresh regeneration gas thus formed is introduced directly into the bottom of the conveyance-regeneration zone to initiate solids regeneration and to convey the solids. This modification requires somewhat higher flue gas recirculation rates and limits slightly the coke burn-off rate in a given installation.

The second modification consists in cooling part of the treated spent flue gas to approximately the ignition temperature of the spent solids, and injecting this gas with added oxygen into the bottom of the conveyance regeneration zone to initiate combustion and conveyance. The remainder of the regeneration gas is cooled to as low a temperature as practicable, such as about 100° F., and is injected together with additional oxygen directly into the conveyance-regeneration zone at an intermediate point along the length thereof to reduce regeneration temperatures and to introduce further fresh regeneration fluid. If desired, a plurality of injection points may be disposed along the length of the conveyance regeneration zone to effect complete control over regeneration temperatures at all points.

The third modification involves cooling part of the treated spent regeneration gas to a temperature no lower than the spent solids ignition temperature and injecting it together with additional oxygen into the bottom of the conveyance regeneration zone. This is the same step as the first step in the second modification discussed above. The remainder of the flue gas is cooled to as low a temperature as practicable, is mixed with additional quantities of oxygen, and is passed through indirect heat exchange with a substantial portion of the conveyance-regeneration zone itself so as to cool the regeneration zone walls and raise the temperature of the second regeneration fluid portion to the solids ignition temperature. The thus heated gas then passes directly into the bottom of the conveyance regeneration zone with the first portion.

The present invention will be more readily understood along with its various modifications with reference to the accompanying drawing in which.

Figure 1:
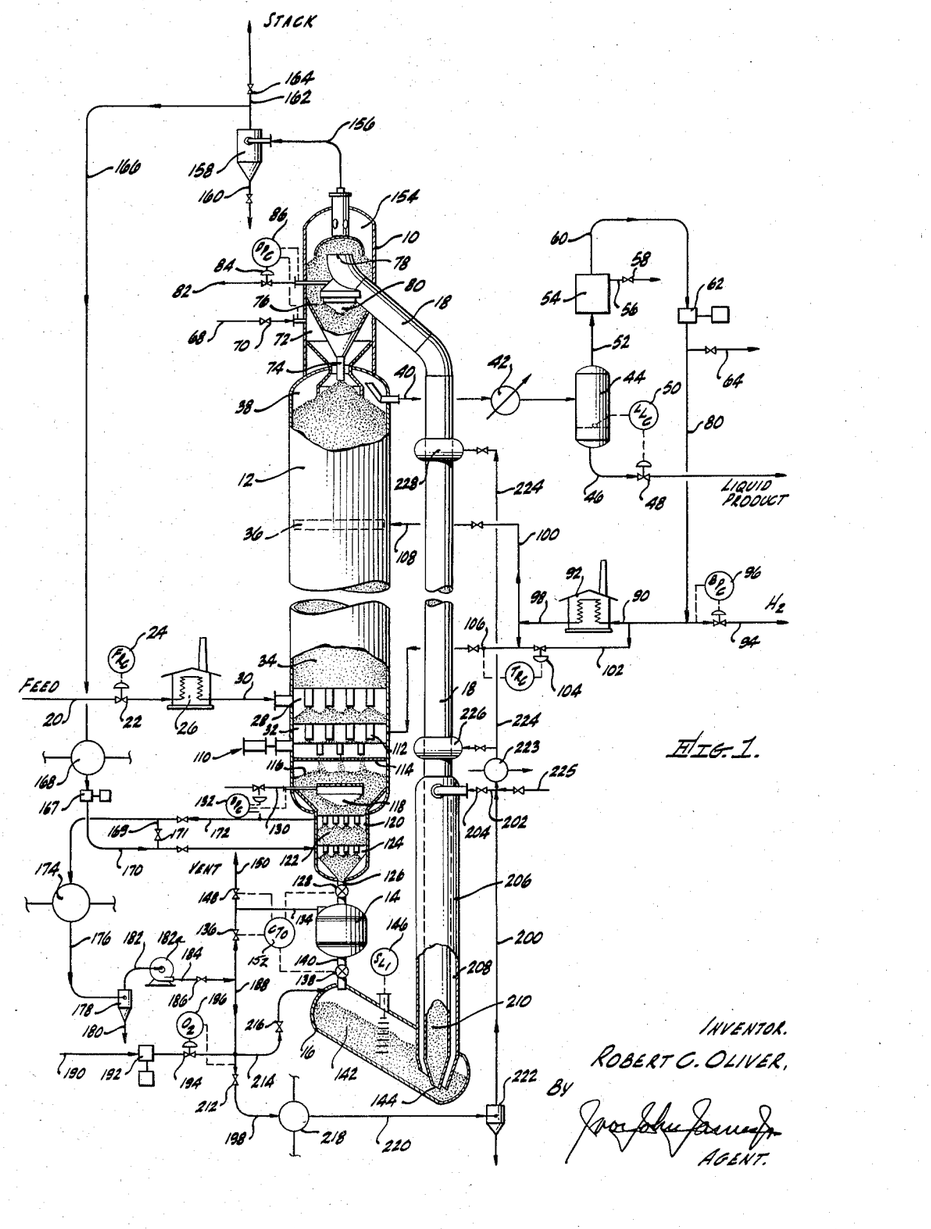
Figure 1 is a combination elevation view in partial cross section of the apparatus of this invention and a schematic flow diagram of the process of this invention.

The description of Figure 1 is conducted in terms of a specific example of the present invention as applied to the continuous reforming and desulfurization of a petroleum mixed cracked and straight run naphtha heavily contaminated with sulfur and in which the naphtha contacts a recirculated stream of cobalt molybdate type catalyst in the presence of a recirculated stream of hydrogen. Although specific operating temperatures and pressures and other conditions are given, the limits of these operating conditions in this particular application include a temperature of from 500° F. to 1100° F., a pressure between about 50 p.s.i.g. and about 2000 p.s.i.g. hydrogen recycle rate of between about 500 s.c.f. and about 10,000 s.c.f. (standard cubic feet) of hydrogen per barrel of naphtha, and an LHSV (liquid hourly space velocity) of 0.1–10 volumes of liquid naphtha feed per volume of bulk solid contact material between the naphtha inlet and the naphtha outlet per hour. The cobalt molybdate catalyst is preferably a silica stabilized alumina catalyst base and analyses between about 7% and about 22% by weight total CoO plus $MoO_3$ wherein the molecular ratio of CoO to $MoO_3$ is between about 0.4 and 5.0.

Referring now more particularly to Figure 1, the apparatus consists essentially of catalyst separator and pretreating chamber 10 into which the regenerated catalyst is discharged, naphtha reforming column 12 through which the catalyst passes downwardly as a moving bed by gravity, catalyst pressuring chamber 14 receiving spent catalyst from reforming chamber 12, induction chamber 16 into which the spent pressured catalyst is discharged, and conveyance-regeneration chamber 18 through which the spent catalyst is conveyed and regenerated and discharged for recirculation into separator chamber 10.

The apparatus of this invention as shown in the drawing is for the catalytic reforming and desulfurization of 1100 barrels per stream day of a petroleum naphtha having the following properties:

TABLE I

*Naphtha feed*

| | |
|---|---|
| Boiling range, °F. | 240–420 |
| API gravity, degrees | 46.3 |
| Sulfur, weight percent | 0.578 |
| Nitrogen, weight percent | 0.020 |
| Knock rating (F–1 clear) | 61.8 |
| Naphthenes, volume percent | 42 |
| Aromatics, volume percent | 15 |

The naphtha feed is introduced through line 20 at a rate of 1100 barrels per day controlled by valve 22 and flow recorder controller 24 and is preheated and vaporized in fired preheater 26. The naphtha vapor passes through line 30 at a temperature of 900° F. and a pressure of 405 p.s.i.g. into naphtha engaging zone 28 of contacting column 12. A primary stream of recycle gas containing hydrogen gasses into primary cycle gas engaging zone 32 at a rate of 1700 M s.c.f. per day and also at a temperature of 900° F. The mixture of hydrogen and naphtha passes upwardly countercurrent to the downwardly flowing bed 34 of cobalt molybdate catalyst wherein cyclization of paraffin hydrocarbons to form naphthenes and the endothermic dehydrogenation or aromatization of the naphthenes take place to produce aromatic hydrocarbons. Under the conditions described the hydrocarbon derivatives of sulfur are decomposed to produce hydrogen sulfide and a sulfur contaminated catalyst. These reactions usually have a net endothermic effect causing the temperature of the reactants to decrease with height in reactor column 12. To counteract this temperature decrease and to maintain an isothermal temperature profile, at least one auxiliary recycle gas engaging zone 36 is provided into which hydrogen recycle gas at about 1150° F. is injected at a total rate of 2420 M s.c.f. per day. It is desirable in tall columns to subdivide this recycle gas into a plurality of streams and inject them at a plurality of points along the length of the reactor. The maximum temperature in the reactor is about 910° F. The effluent mixture of hydrocarbon and hydrogen and some light gases collects in and is removed from disengaging zone 38 at a temperature of about 880° F. and a pressure of 400 p.s.i.g. through line 40.

The effluent then passes into and through product condenser 42 and is then introduced into separator 44. The condensate comprising a desulfurized naphtha of improved anti-knock quality is removed through line 46 at a rate of 1028 barrels per day controlled by valve 48 and liquid level recorder 50. The liquid product has the following properties:

TABLE II

*Reformed naphtha product*

| | |
|---|---|
| Boiling range, °F. | 94–435 |
| A.P.I. gravity | 51.7 |
| Sulfur, weight percent | 0.009 |
| Nitrogen, weight percent | ______ |
| Knock rating (F–1+3 cc. TEL) | 95 |
| Naphthenes, volume percent | 14 |
| Aromatics, volume percent | 40 |

The uncondensed portion of the effluent consists primarily of hydrogen recycle gas which is removed from separator 44 through line 52. The gas is subjected to a gas purification treatment in zone 54 whereby, if desired, hydrogen enrichment is effected by separating hydrogen sulfide and lower molecular weight normally gaseous hydrocarbons. This separated gas is sent to further processing or storage facilities not shown by means of line 56 controlled by valve 58.

The hydrogen-rich recycle gas passes through line 60 and is compressed in compressor 62 from about 375 p.s.i.g. to about 425 p.s.i.g. for recirculation. Part of this compressed gas is passed by means of lines 64 and 68 at a rate of 165 M s.c.f. per day controlled by valve 70 into catalyst pretreating chamber 10. This pretreating gas is introduced into pretreating gas engaging zone 72, passes downwardly therethrough into the top of reactor column 12, and is there divided into a first and second portion. The first portion passes through the solids bed into effluent disengaging zone 38 and is removed therefrom with the effluent through line 40 to prevent effluent hydrocarbons from flowing upwardly into pretreating chamber 10 through sealing leg 74. The second portion passes upwardly through sealing leg 74, countercurrent to the downwardly flowing mass of catalyst 76 and effectively pretreats the hot regenerated cobalt molybdate catalyst therein. The pretreating gas along with a minor stream of regeneration gas flowing concurrently with the regenerated catalyst from regeneration outlet 78 collects and mixes in seal gas disengaging zone 80. It is removed therefrom as a seal gas through line 82 at a rate of 205 M s.c.f. per day controlled by valve 84 in accordance with differential pressure controller 86.

Returning now to the recycle gas stream, the remaining portion of compressed hydrogen flows at a rate of 3460 M s.c.f. per day through lines 80 and 90 into recycle gas heater 92. Any excess production of hydrogen accumulating in the system will cause the operating pressure to increase and accordingly such quantities of hydrogen are bled from the system through line 94 at a rate controlled by back pressure controller 96.

Preheater 92 preheats recycle gas to a temperature of 1150° F. which flows therefrom through line 98 into recycle gas manifold 100. Herein the heated recycle gas is divided and a portion thereof is mixed with 660 M s.c.f. per day of unheated hydrogen flowing through line 102 at a rate controlled by valve 104. The primary recycle gas mixture thus formed then flows through line 106 into engaging zone 32 as described. The remaining 1150° F. hydrogen flows through line 108 into engaging zone 36 as described.

The spent hydrocarbonaceous catalyst passes downwardly through reactor column 12 at a rate of about 860 pounds per hour controlled by solids feeder and stripper 110 which is provided with a reciprocating tray 112 and a lower stationary tray 114. Upon reciprocation of tray 112 at a uniform rate a substantially constant volumetric withdrawal of spent catalyst is achieved uniformly throughout the cross sectional area of column 12. This spent catalyst accumulates as a downwardly moving bed 116 in the bottom of column 12 and moves downwardly therethrough successively through lower seal gas disengaging zone 118, treated regeneration gas disengaging zone 120, spent regeneration gas treating zone 122, spent regeneration gas engaging zone 124, and then through outlet 126 at the bottom of the column provided with valve 128. The solids pass intermittently into the pressuring chamber 14 or continuously into a plurality of pressuring chambers not shown.

The spent solids are discharged into chamber 14 with valve 128 open and the pressure at about 400 p.s.i.g. A displacement gas passes upwardly through solids outlet 126 into spent regeneration gas treating zone 122 which ultimately causes a net flow of seal gas into disengaging zone 118 wherein it mixes with a minor portion of the primary recycle gas passing downwardly from zone 32 through solids feeder zone 110 into the same zone. This lower seal gas is disengaged at a rate of 140 M s.c.f. per day through line 130 controlled by differential pressure controller 132.

By means of the upper and lower sealing systems just described, the reactant vapors passing through column 12 are not allowed to contaminate or be contaminated by the fluids being recirculated in the conveyance-regeneration system.

Valve 128 is closed and inert flue gas is introduced through manifold 134 to raise the pressure in chamber 14 to about 430 p.s.i.g. upon the opening of valve 136. At this time valve 138 is opened, and the pressured solids discharged through conduit 140 into induction zone or chamber 16 to form and maintain a downwardly moving bed of spent solids 142, submerging inlet opening 144 of regeneration conduit 18. Solids level indicator 146 is provided to determine the solids inventory in the system.

Valve 138 is then closed, valve 148 is then opened, and the gases in chamber 14 are vented through lines 134 and 150 to reduce chamber 14 in pressure to a value substantially equal to that in the bottom of reactor column 12. Valve 138 is then closed, valve 128 is then reopened, and the cycle is repeated at a rate controlled by cycle timer operator 152 to pressure spent solids into induction chamber 16 at a rate equal to that set by solids feeding device 110 which controls the solids recirculation rate in the system.

Referring now specifically to the pretreating chamber 10, spent regeneration gases collecting in disengaging zone 154 are removed therefrom through line 156 at a rate of 1612 M s.c.f. per day and a temperature of 984° F. This gas flows through a fines separator 158 from which catalyst fines are removed through line 160. A net production flow of spent regeneration fluid passes through line 162 at a rate controlled by valve 164 and is vented to a stack. The remaining spent regeneration gas flows through line 166 through primary cooler 168 which may be controlled to reduce the gas temperature to about 900° F. Desirably however, the uncooled spent regeneration gas passes directly through initial compressor 167 wherein part of the flue gas recompression is effected. The gas is pressured by about 5 p.s.i.g. to about 15 p.s.i.g. which is about equivalent to the pressure drop from the bottom to the top of the reactor. The gas then is passed through line 170 into engaging zone 124 for upward passage through, and sulfur trioxide removal by, the spent carbonaceous catalyst in treating zone 124. A controlled portion of the gas may be by-passed through line 169 controlled by valve 171. The spent catalyst is preheated to a temperature of about 975° F., a portion of the carbonaceous material is removed therefrom, and a treated stream of spent regeneration gas free of sulfur trioxide flows through line 172 into recycle regeneration gas cooler 174. Herein the treated regeneration gas may be cooled to temperatures as low as 100° F. without danger of sulfuric acid corrosion and precipitation even though such temperatures are well below the water vapor dew point. In the present instance this gas is cooled to temperatures of the order of 100° F. to 400° F. and then flows through line 176 into condensate separator 178 from which water is removed through line 180. The partially cooled spent flue gas then flows through line 182, is further compressed to a pressure of about 430 p.s.i.g. in compressor 182, and flows through line 184 at a rate of 1612 M s.c.f. per day controlled by valve 186 into manifold 188. It is from this manifold that pressuring gas for chamber 14 flows through manifold 134.

An oxygen containing gas such as air is introduced through line 190 and is compressed to a pressure of about 430 p.s.i.g. in compressor 192. The air then passes at a rate of 123 M s.c.f. per day controlled by valve 194 and oxygen controller 196 into manifold 188 for admixture with the treated cool regeneration gas therein to form a fresh oxygen containing regeneration gas for use in the conveyance-regeneration conduit 18.

In one modification this fresh gas flows through lines 198, 220, and 200 and is introduced through line 202 with valve 204 opening into the upper portion of heat exchange jacket 206. It passes downwardly through annulus 208 and is preheated therein to the spent solids ignition temperature, about 400° F., by indirect heat exchange. The regeneration gas then enters inlet opening 144, passes upwardly therethrough concurrently with rising mass of regenerating spent catalyst 210, and conveys and regenerates the solids as it transports them toward outlet opening 78 in pretreating chamber 10.

In a second modification of conveyance regeneration zone operation, the pretreated spent regeneration fluid is cooled in cooling zone 174 only to a temperature approximating the catalyst ignition temperature and oxygen is added thereto. In this operation valve 212 at the bottom of manifold 188 is closed and the entire fresh regeneration gas flows through line 214 controlled by valve 216 into the upper portion of induction chamber 16. It passes downwardly through moving bed 142 toward inlet 144 and passes upwardly through regeneration conduit 18 as described.

In a third modification the spent pretreated regeneration gas is cooled in cooling zone 174 only to the catalyst ignition temperature, is mixed with oxygen in manifold 188, and part of the gas passes through line 214 into chamber 16. The balance of the fresh regeneration gas thus formed flows through line 198 through secondary cooler 218 wherein it is cooled to as low a temperature as practicable to recover additional heat. This cooled gas portion then flows through line 220 into condensate separator 222 and then continues therefrom through line 200 upwardly with valve 204 at least partly closed through cooler 223 into manifold 224. The additional cooling in cooler 223 permits a higher oxygen concentration in the oxygen containing gas. Also this may be effected by adding air via line 225 to raise the oxygen concentration to as high as 5% from the 2% described above. From this manifold the cool oxygen containing gases are directly injected into conveyance regeneration zone 18 through one or more injection zones 226, 228, and the like. The cooled gas so injected supplies additional oxygen to the regeneration and by appropriate spacing of the injection points a substantially uniform temperature profile may be obtained throughout conduit 18.

If desired any combination of the foregoing modifications just described may be utilized.

Figures 2, 3, 4:
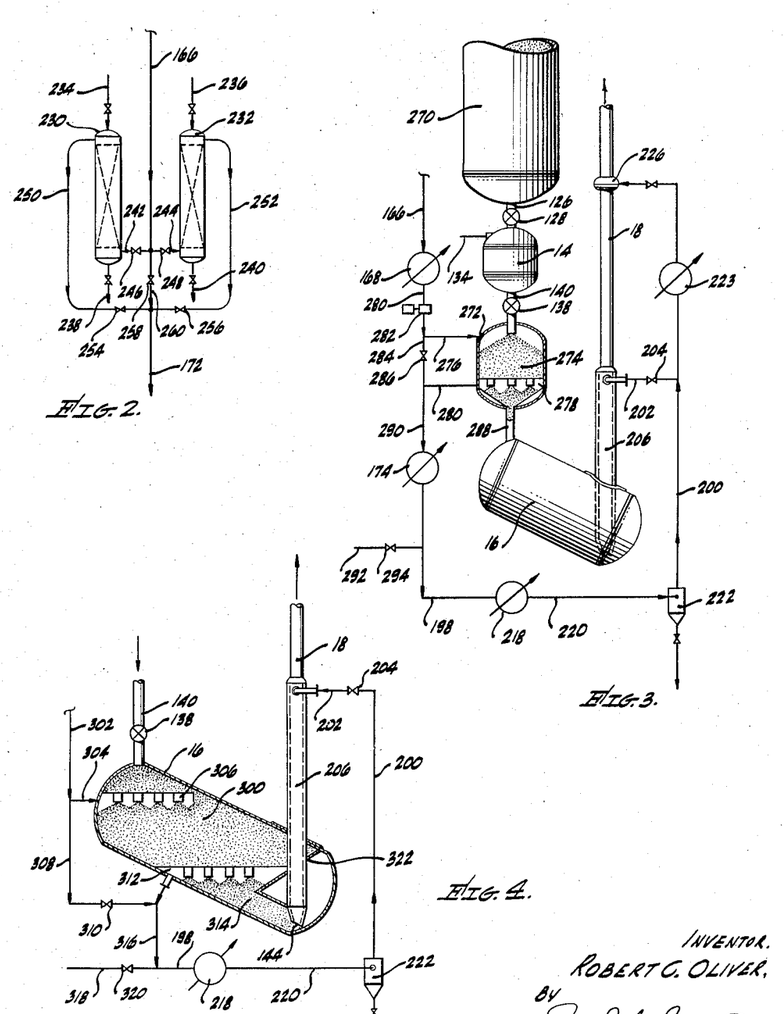
Figure 2 is a schematic diagram of a modification of spent flue gas treatment.
Figures 3 and 4 are semi-detailed elevation views in partial cross section showing modified processes and apparatus for utilizing the spent hydrocarbonaceous contact solids for treating the spent flue gas.

Referring now more particularly to Figure 2 an optional form of spent regeneration gas treatment is illustrated. Spent regeneration gas recycle line 166 of Figure 1 is provided with a pair of contacting vessels 230 and 232 each filled with a bed of carbonaceous solids. Solids inlets 234 and 236 and solids outlets 238 and 240 are provided for the introduction and removal respectively of the carbonaceous solids. Line 166 carrying the hot spent regeneration gas communicates through lines 242 or 244 controlled by valves 246 and 248 with the gas inlets to vessels 230 and 232 respectively. The treated gas flows through outlets 250 or 252 controlled by valves 254 and 256 respectively and are returned to line 172 for passage through cooler 174 as described at a point below by-pass valve 258.

In this modification the spent regeneration gas to be treated is passed alternately through each of the vessels 230 and 232 for the treatment described above to prevent sulfuric acid precipitation in the system. These vessels are charged with carbonaceus solids such as those indicated previously. Only a portion of the spent gas may be passed at any one time through a contacting vessel while the remainder may be by-passed through line 260 controlled by valve 258.

Referring now more particularly to Figure 3, a modification of the system of Figure 1 is shown in which the spent regeneration gases are treated with the spent carbonaceous contact solids after they have been pressured and before introduction into the conveyance-regeneration zone. In this figure the bottom of the contacting column is indicated generally as 270. The spent catalyst is withdrawn through line 126 controlled by valve 128 and is introduced into and pressured in pressuring vessel 14 by introduction of a pressuring fluid through line 134. The pressured spent solids are removed through line 140 controlled by valve 138 as described in Figure 1.

The pressured spent contact material gravitates into separate treating vessel 272 through which it moves downwardly as a compact granular solids bed 274. The hot spent regeneration gas passes by means of line 166 at about 1050° F. into and through primary cooler 168 wherein it is cooled to about 700° F., and then passes through line 280 into compressor 282 wherein the pressure is raised from 392 p.s.i.g. to 440 p.s.i.g. This gas then flows through line 276 into treating zone 272 for downward passage through carbonaceous solids bed 274. Herein at a temperature of about 700° F. the residual oxygen if any and the sulfur trioxide and sulfuric acid are all reduced by contact with the carbonaceous material. Substantially all of the treated flue gas is disengaged from the solids in treated recycle gas disengaging zone 278 and is removed therefrom through line 280 at a pressure of 439 p.s.i.g. About 95–99% of the treated gas is so removed when by-pass line 284 is closed by valve 286. The remaining 1–5% of the treated gas flows downwardly concurrently with the partially regenerated solids through sealing leg line 288 into induction chamber 16. The partially regenerated catalyst forms a downwardly moving bed in chamber 16 submerging the inlet opening of conveyance-regenerator zone 18 just as in Figure 1. The induction and conveyance zone elements herein shown and indicated by the same numbers as those in Figure 1, to which reference is herewith made, are constructed and operated in the manner there described.

The treated flue gas, free of sulfur trioxide and sulfuric acid, flows through line 280 and line 290 into cooler 174 analogous to that of the same number in Figure 1. An oxygen containing gas such as air is introduced through line 292 controlled by valve 294 in an amount sufficient to effect the required degrees of regeneration. The fresh oxygen containing regeneration gas then continues on through line 198 for introduction into the regeneration system in the same manner as has been described in connection with Figure 1 above.

Referring now more particularly to Figure 4 a third modification of the process of this invention for treating spent regeneration recycle gas with spent hydrocarbonaceous contact material for their mutual benefit is shown. Herein induction zone 16 is again shown with a modified internal structure. As before the spent solids are introduced through line 140 controlled by valve 138 from a pressuring zone such as zone 14 shown in Figure 1. The solids pass laterally and downwardly as a moving bed 300 toward lower inlet opening 144 or conveyance-regenerator conduit 18. As described in connection with Figure 3, the spent regeneration gases are first cooled to about 700° F., and are then compressed by an amount approximating the pressure differential characteristic of the conveyance-regenerator step, that is, from about 392 p.s.i.g. to about 440 p.s.i.g. in the Figure 1 example.

The cooled compressed recycle gas is in this condition introduced through line 302 and line 304 into treating gas engaging zone 306. A portion of the gas if desired may be by-passed through line 308 controlled by valve 310. The gas to be treated passes downwardly from zone 306 concurrently with moving solids bed 300 wherein any oxygen, the sulfur trioxide, and any sulfuric acid present are reduced by oxidation of part of the hydrocarbonaceous deposit present on the solid contact material. Again a partial regeneration of the solids is effected reducing the regenerator duty.

A substantial proportion, such as about 90–95%, of the treated gas is disengaged from the solids in treating gas disengaging zone 312. The remaining portion passes downwardly concurrently with the solids therebelow through moving bed 314 which progresses toward lower inlet opening 144 of the regenerator. This portion of the gas flow usually amounts to about 5–10% of the total regeneration gas recycle.

The treated recycle gas then flows through line 316 at a pressure of about 439 p.s.i.g., an oxygen containing gas such as air is introduced through line 318 controlled by valve 320 forming a fresh regeneration gas, and this fresh regeneration gas then passes through line 198, cooler 218, line 220, and then back through line 200 into the conveyance-regeneration zone according to any one of the several modifications described in connection with Figure 1.

The engaging and disengaging zones 306 and 312 consist of a transverse tray provided with a plurality of short open ended tubes depending therefrom through which the catalyst flows and around which is formed a gas space. An inclined baffle 322 is disposed around the regeneration zone jacket 206 and directs the partially regenerated catalyst downwardly toward the regeneration zone inlet 144.

The modifications just described in connection with Figures 3 and 4 have some advantages over the modification of Figure 1, the primary advantage being that a single compressor for the recycle gas is required compared to the two stage compressor employed in Figure 1.

Although the spent regeneration gas may be treated according to this invention in any of the ways shown in Figures 1 through 4, the effect on the spent gas is substantially the same. However the modifications indicated in Figures 1, 3 and 4 are preferred because of the beneficial effect upon the extent of spent catalyst regeneration which is required to be effected in regenerator conduit 18, and the avoidance of the necessity to periodically recharge the contactor vessels of Figure 2.

In the apparatus of this invention, the entire structure above grade level is about 55 feet in height, the reactor column diameter is 4 feet 6 inches, and the conveyance-regeneration conduit is 14-inch schedule 40 pipe. The catalyst is circulated at a rate of 10.3 tons per day and moves at an upward velocity of 15.5 feet per hour through the regeneration-conveyance conduit. This low velocity is totally impossible to maintain in a gas-lift or pneumatic suspension conveyor, and herein it permits the complete regeneration of the catalyst during the lifting step which is also impossible in gas-lift conveyances.

Although the present invention has been described in considerable detail above with respect to gasoline or naphtha reforming, it should be understood that the principles of this invention and the advantages accruing therefrom are equally obtainable in any other hydrocarbon conversion process in which a recirculating granular contact material which requires regeneration is employed in the conversion of fluid which produces sulfur oxides or solids regeneration. It is therefore not intended to limit this invention to gasoline reforming specifically but on the contrary the invention relates to fluid-solids contact processes in general in which an oxidative regeneration of the recirculating contact material is effected in the presence of a recirculating stream of flue gas which is externally cooled.

The treated spent regeneration gas prepared in any of the several ways just described is free of sulfur trioxide and sulfuric acid. Part of this gas is used in the hydrocarbon conversion process described in Figure 1 to purge the slide valves (128 and 138) to keep solids fines from causing abrasion, to purge the instrumentation pressure taps throughout the system, and for other uses requiring an inert noncorrosive gas.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a process for the conversion of hydrocarbons contaminated with hydrocarbon derivatives of sulfur comprising recirculating a stream of solid contact material through a hydrocarbon conversion zone and a solids regeneration zone, passing the hydrocarbon to be converted through said conversion zone in direct contact with said contact material therein, maintaining hydrocarbon conversion conditions of temperature, pressure, and composition therein to produce a treated hydrocarbon as effluent and leaving a spent hydrocarbonaceous sulfurous contact material, passing an oxygen-containing regeneration gas through said regeneration zone, maintaining solids regeneration conditions of pressure, temperature and composition therein to remove the hydrocarbonaceous and sulfurous materials as a flue gas containing oxides of sulfur leaving a regenerated contact material, and recirculating said flue gas through zones of cooling to recover at least part of the liberated heat of regeneration and of recompression to return said gas at least in part to said regeneration zone, the improvement which comprises passing said flue gas also through a treating zone prior to its return to said regeneration zone, and contacting said gas in said treating zone with at least a portion of said spent hydrocarbonaceous sulfurous contact material prior to the regeneration thereof, to thereby adsorb and remove from said flue gas the higher sulfur oxides and sulfuric acid and form a treated flue gas having a substantially reduced dew point permitting said gas to be cooled substantially to the water dew point without the formation of corrosive sulfuric acid condensates.

2. A process according to claim 1 in combination with the step of conducting the contact in said treating zone at a temperature above the sulfuric acid dew point of said flue gas and below the temperature at which the solid contact material is thermally damaged.

3. A process according to claim 2 wherein said temperature is between about 500° F. and about 1200° F.

4. A process according to claim 3 wherein said hydrocarbon conversion catalyst analyzes between about 7% and about 22% by weight of total CoO plus MoO$_3$ and wherein the molecular ratio of CoO to MoO₃ is between about 0.4 and about 5.0.

5. A process according to claim 1 wherein said regeneration zone comprises a conveyance regeneration zone in combination with the steps of submerging the bottom inlet thereto with a dense mass of spent contact material from said conversion zone, passing at least part of said regeneration gas through said mass prior to introduction thereof into said inlet, controlling the regeneration gas flow rate through said conveyance-regeneration zone at a value sufficient to maintain a pressure gradient $$\frac{dp}{dl}$$

in pounds per square foot per foot throughout said regeneration zone which exceeds $$\rho_s \cos \theta$$

wherein $\rho_s$ is the bulk density of the solid contact material in pounds per cubic foot and $\theta$ is the angular deviation of the conveyance direction from a vertical upward reference axis, restricting the discharge of regenerated solid material from the upper outlet of said conveyance-regeneration zone to maintain the solids therein during regeneration as a compact upwardly moving mass of solids having a bulk density substantially equal to the static bulk density of the solids when at rest, controlling the oxygen concentration in said regeneration gas to avoid thermal damage to said solids during regeneration, and returning the solid material, in substantially completely regenerated form effected during conveyance and without further treatment, by gravity from the top of said conveyance-regeneration zone to said conversion zone.

6. A process according to claim 5 in combination with the step of passing spent solids between said conversion zone and said conveyance-regeneration zone through a solids pressuring zone, sequentially introducing solids thereinto at a relatively low pressure, sealing said zone, introducing a relatively high pressure fluid, and removing said solids by gravity at a pressure relatively higher by an amount substantially equal to the integrated pressure gradient existing in said conveyance-regeneration zone.

7. A process according to claim 6 in combination with the step of passing the pressured spent contact material from said pressuring zone through said treating zone into said conveyance-regeneration zone and contacting at least part of said spent flue gas with said pressured spent contact material therein to effect a partial regeneration thereof and the removal of sulfur trioxide and sulfuric acid from said gas.

8. A process according to claim 6 in combination with the steps of discharging spent solids from said pressuring zone into an induction zone communicating at its top with said pressuring zone and at its bottom with said conveyance-regeneration zone, maintaining therein a downwardly moving dense bed of spent solid contact material submerging the solids entrance to said conveyance-regeneration zone, and passing at least part of said spent flue gas through part of said induction zone comprising said treating zone to effect a partial regeneration of said spent contact material and to remove sulfur trioxide and sulfuric acid from said spent flue gas.

9. A process according to claim 5 in combination with the step of introducing at least part of the treated flue gas from said treating zone at an intermediate point along the length of said conveyance-regeneration zone.

10. In a process for the conversion of hydrocarbons contaminated with hydrocarbon derivatives of sulfur which comprises passing a moving bed of cobalt molybdate catalyst downwardly by gravity through a hydrocarbon conversion zone, passing the hydrocarbon to be converted through said conversion zone at a temperature between about 550° F. and about 1100° F., a pressure of between about 50 p.s.i.g and about 2500 p.s.i.g., and at a rate of between about 0.1 and about 10.0 volumes of hydrocarbon feed per volume of conversion zone per hour in the presence of between about 500 and about 10,000 s.c.f. of hydrogen per barrel of feed, to produce an improved hydrocarbon product and leaving a spent hydrocarbonaceus sulfurous catalyst, passing said spent catalyst through a regeneration zone, passing thereinto a fresh regeneration gas comprising a treated flue gas containing added oxygen, controlling the temperature therein at a value above the spent catalyst ignition temperature but insufficient to cause thermal damage to the catalyst to burn the hydrocarbonaceous and sulfurous materials therefrom, thereby forming a regenerated catalyst and a spent flue gas, and returning the catalyst to said conversion zone for reuse, the improvement in spent catalyst regeneration which comprises removing said spent flue gas containing sulfur trioxide and sulfuric acid from said conveyance-regeneration zone, contacting at least part of said spent gas with at least a portion of said spent hydrocarbonaceous sulfurous catalyst prior to the regeneration thereof, said contacting being effected at a temperature between about 500° F. and about 1200° F. to thereby remove said sulfur trioxide and sulfuric acid and form said treated flue gas, cooling said treated flue gas to recover a substantial part of the heat of regeneration therefrom, adding a gas containing oxygen to at least part of said treated flue gas to form said fresh regeneration gas, and introducing said gas into said regeneration zone.

11. A process according to claim 10 wherein said regeneration zone comprises a conveyance-regeneration zone in combination with the steps of submerging the bottom inlet thereto with a dense mass of said spent catalyst removed from said conversion zone, passing at least part of said regeneration gas through said mass prior to introduction thereof into said inlet, controlling the regeneration gas flow rate through said conveyance-regeneration zone at a value sufficient to maintain a pressure gradient $$\frac{dp}{dl}$$

in pounds per square foot per foot throughout said regeneration zone which exceeds $$\rho_s \cos \theta$$

wherein $\rho_s$ is the bulk density of the catalyst in pounds per cubic foot and $\theta$ is the angular deviation of the conveyance direction from a vertical upward reference axis, restricting the discharge of regenerated catalyst from the upper outlet of said conveyance-regeneration zone to maintain the solids therein during regeneration as a compact upwardly moving mass of solids having a bulk density substantially equal to the static bulk density of the solids when at rest, controlling the oxygen concentration in said regeneration gas to avoid thermal damage to said solids during regeneration, and returning the catalyst, substantially completely regenerated and without further treatment during the conveyance, by gravity from the top of said conveyance-regeneration zone to said conversion zone.

12. A process according to claim 10 in combination with the step of reheating the cool fresh regeneration gas to the spent catalyst ignition temperature prior to introduction into contact with spent catalyst in said regeneration zone.

13. In an apparatus for contacting a fluid with a recirculating stream of granular solid contact material including a solids-receiving and fluid disengaging chamber, a contacting column, and a solids pressuring chamber disposed at successively lower levels, and an elongated conveyance-regeneration conduit communicating at its inlet with said pressuring chamber and at its outlet with said solids-receiving and fluid disengaging chamber, means adjacent said outlet to apply a force against solids discharging therefrom to maintain them in said conduit substantially at their static bulk density, fluid inlet and outlet means for passing a fluid through said contacting column, a fluid outlet for disengaged fluid from said fluid disengaging chamber, means for recirculating fluid from said outlet through an external cooler and back into the inlet of said conveyance-regeneration conduit and means communicating with said solids pressuring chamber for the introduction and removal of fluids, the improvement in combination with said means for recirculating fluid through said conveyance-regeneration conduit which comprises a fluid treating chamber containing a carbonaceous solid contact material, means connecting the top of said treating chamber in solids-receiving relationship to the bottom of said contacting column, means connecting the bottom of said treating chamber in solids-delivery relationship to said conveyance-regeneration conduit, means connecting said treating chamber in fluid receiving relation to the outlet of said conveyance-regeneration conduit and in fluid delivery relation to said external cooler, and means for adding fluid to the treated fluid flowing from said treating chamber.

References Cited in the file of this patent

UNITED STATES PATENTS

| | | |
|---|---|---|
| 2,081,576 | Carter | May 25, 1937 |
| 2,084,697 | McCluskey | June 22, 1937 |
| 2,292,699 | Kassel | Aug. 11, 1942 |
| 2,357,365 | Van Horn et al. | Sept. 5, 1944 |
| 2,498,559 | Layng et al. | Feb. 21, 1950 |
| 2,539,519 | Melendy | Jan. 30, 1951 |
| 2,562,804 | Martin et al. | July 31, 1951 |
| 2,597,346 | Leffer | May 20, 1952 |
| 2,684,872 | Berg | July 27, 1954 |
| 2,696,461 | Howard | Dec. 7, 1954 |
| 2,753,295 | Ramella | July 3, 1956 |
| 2,758,059 | Berg | Aug. 7, 1956 |
| 2,793,170 | Stiles | May 21, 1957 |
| 2,795,533 | Drew | June 11, 1957 |